Figure 1:
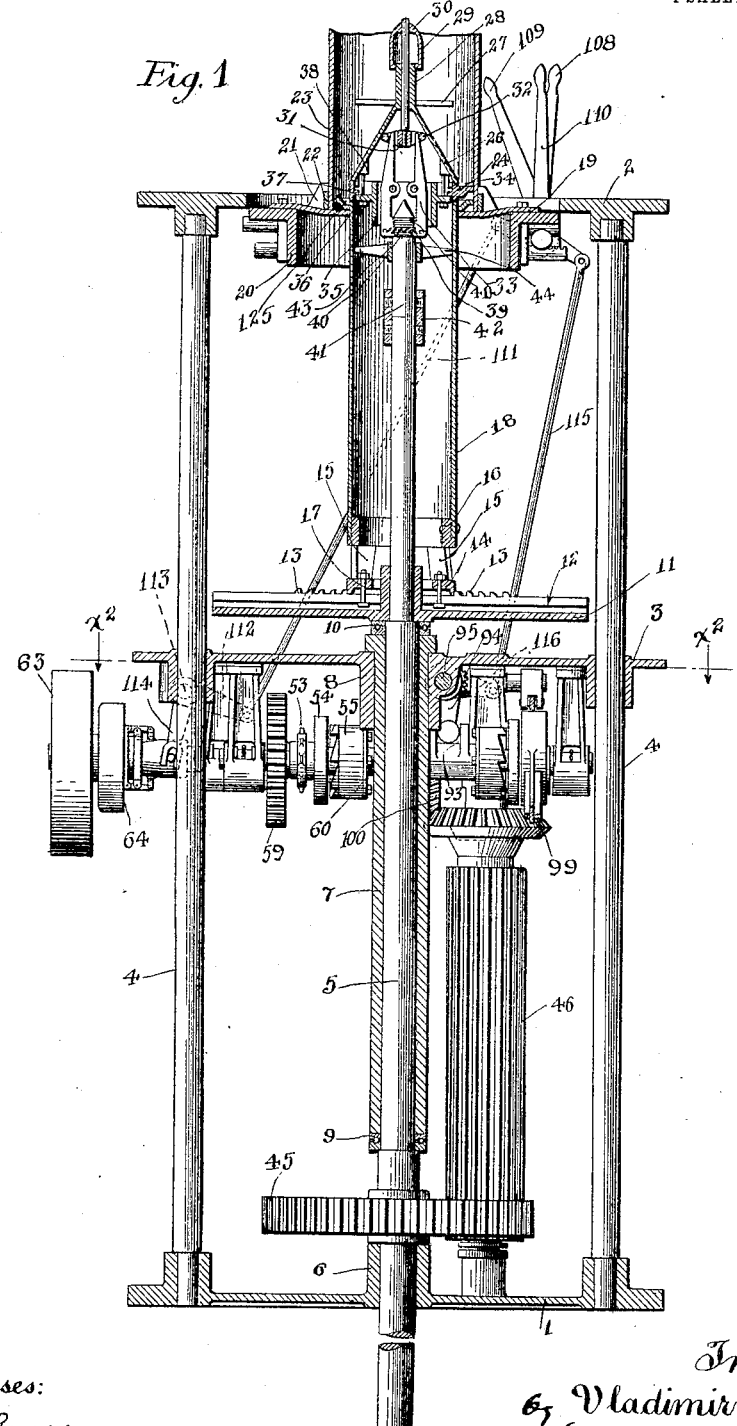

V. V. MESSER.
CONCRETE PIPE MAKING MACHINE.
APPLICATION FILED MAR. 8, 1912.

1,112,638.

Patented Oct. 6, 1914.
4 SHEETS—SHEET 1.

Witnesses:
Sully Russo.
I. D. Thornbugh.

Inventor.
Vladimir V. Messer,
by Syau & Haenley
atty

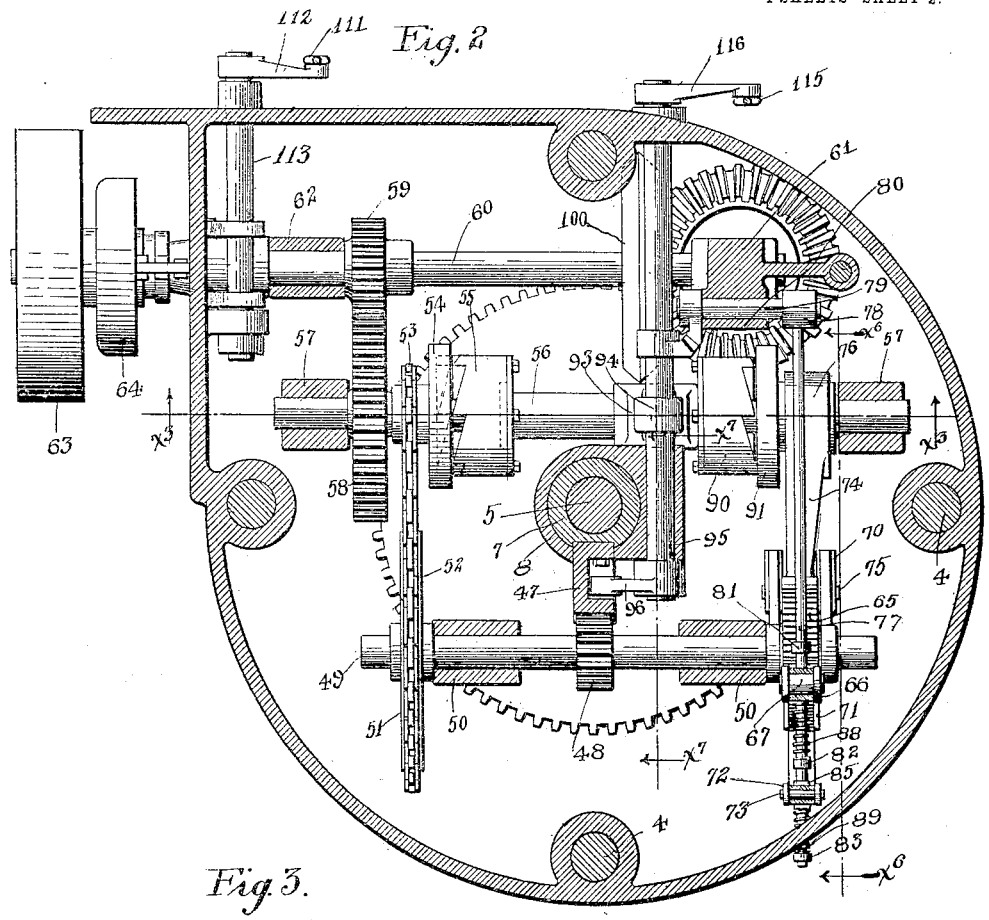
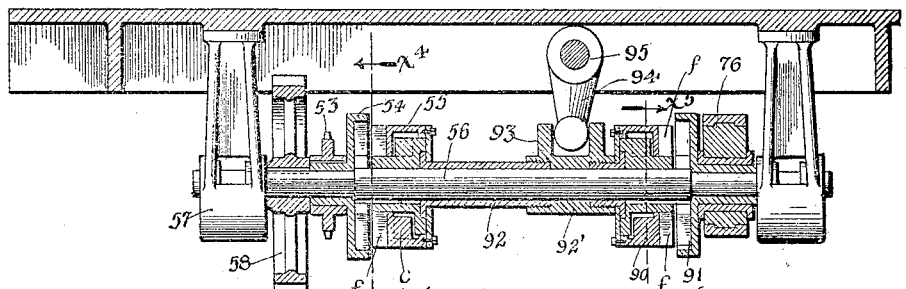
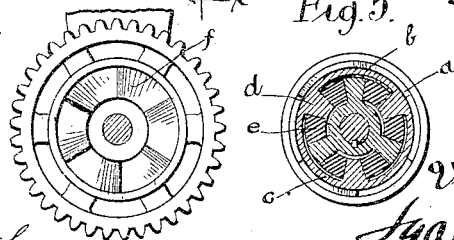

V. V. MESSER.
CONCRETE PIPE MAKING MACHINE.
APPLICATION FILED MAR. 8, 1912.
1,112,638.
Patented Oct. 6, 1914.
4 SHEETS—SHEET 3.
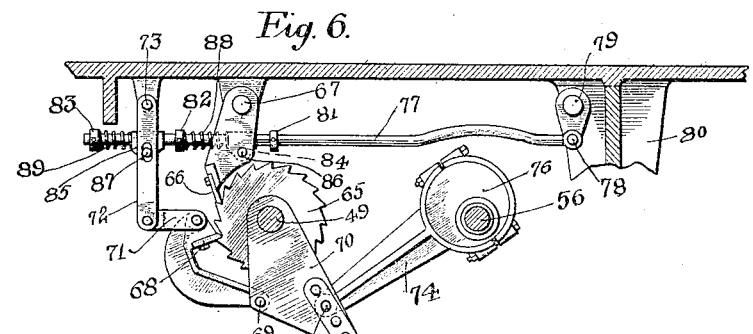
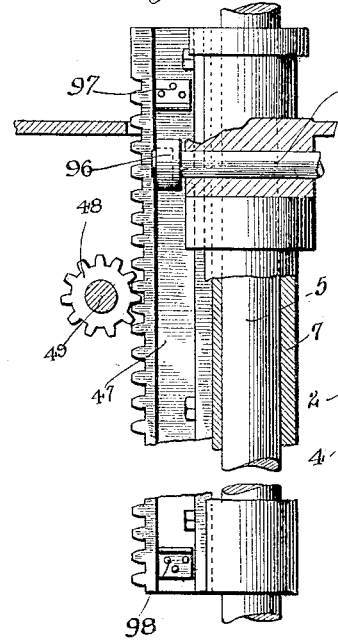
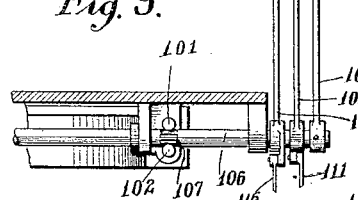
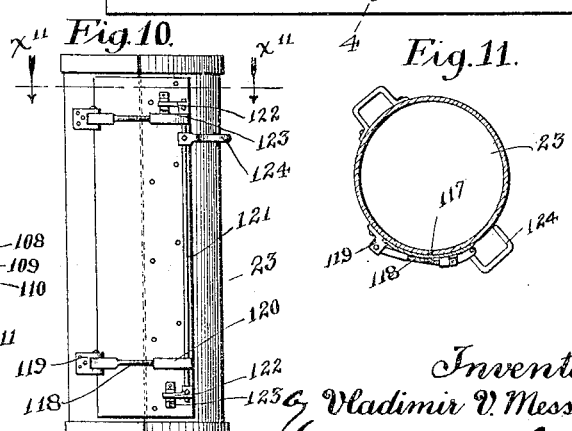
Witnesses:
Sully Russo
I. D. Thornburgh.
Inventor
Vladimir V. Messer.
Lyon & Hackley atty V. V. MESSER.
CONCRETE PIPE MAKING MACHINE.
APPLICATION FILED MAR. 8, 1912.
1,112,638.
Patented Oct. 6, 1914.
4 SHEETS—SHEET 4.
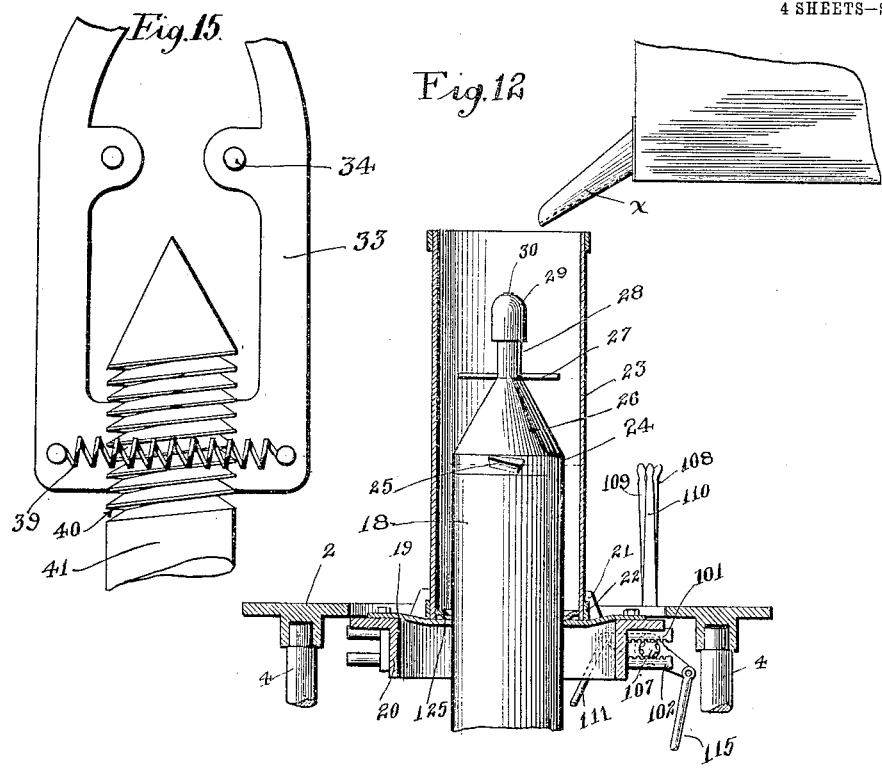
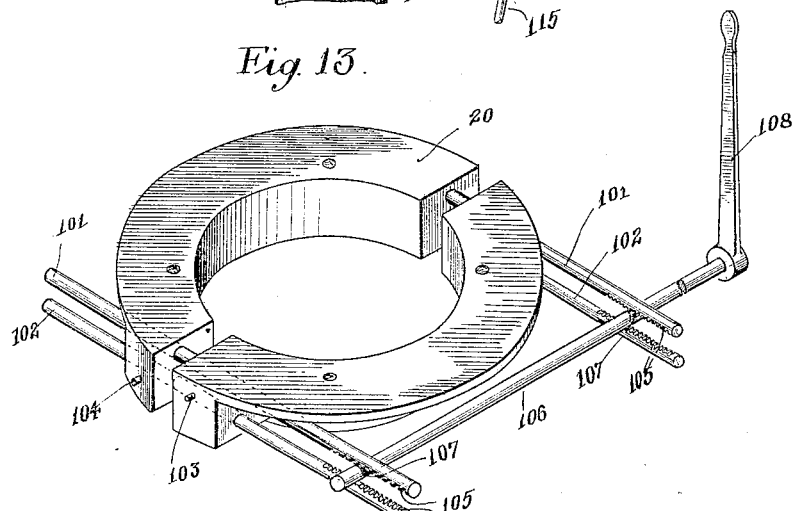
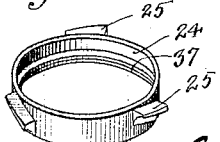
Witnesses:
Sully Russo.
I. D. Thornburgh.
Inventor
Vladimir V. Messer

UNITED STATES PATENT OFFICE.

VLADIMIR V. MESSER, OF LOS ANGELES, CALIFORNIA.

CONCRETE-PIPE-MAKING MACHINE.

1,112,638.   Specification of Letters Patent.   Patented Oct. 6, 1914.

Application filed March 8, 1912. Serial No. 682,545.

*To all whom it may concern:*

Be it known that I, VLADIMIR V. MESSER, a citizen of the United States, residing at Los Angeles, in the county of Los Angeles, State of California, have invented a new and useful Concrete-Pipe-Making Machine, of which the following is a specification.

This invention relates to pipe-making machines, and the main object of the invention is to provide a machine which will produce pipe sections with great rapidity.

Other objects and advantages will be brought out in the following description.

Referring to the drawings, Figure 1 is a vertical longitudinal section through the machine. Fig. 2 is an enlarged cross section on line $x^2$—$x^2$, Fig. 1. Fig. 3 is a section on line $x^3$—$x^3$, Fig. 2. Fig. 4 is a section on line $x^4$—$x^4$, Fig. 3. Fig. 5 is a section on line $x^5$—$x^5$, Fig. 3. Fig. 6 is a section on line $x^6$—$x^6$, Fig. 2. Fig. 7 is a section on line $x^7$—$x^7$, Fig. 2. Fig. 8 is a plan view of the machine. Fig. 9 is a section on line $x^9$—$x^9$, Fig. 8. Fig. 10 is a side elevation in detail of the mold. Fig. 11 is a section on line $x^{11}$—$x^{11}$, Fig. 10. Fig. 12 is an enlarged section of the device for detachably securing the cone to the core. Fig. 13 is a perspective of the clamp. Fig. 14 is a perspective of the ring and tamping blades. Fig. 15 is a side elevation of the detachable screw thread connection.

The frame of the machine consists of a lower plate 1, an upper plate 2, and an intermediate plate 3, which are supported by vertical rods 4. A main shaft 5 extends along the center of the machine, its lower end being journaled in a bearing 6 and its intermediate portion in a sleeve 7, the sleeve 7 being mounted in a bearing 8 on the frame-plate 3. A thrust-bearing 9 is provided at the lower end of the sleeve 7 and a thrust-bearing 10 is provided at the upper end of the sleeve 7.

Supported above the thrust-bearing 10 is a disk 11, having radial T-slots 12, with upwardly projecting teeth 13. Supported on the disk 11 is a table 14, having lugs 15 which support a shouldered ring 16. The ring 16 furnishes a core-support, and there may be various sizes of rings 16 provided with the machine in order to accommodate different diameters of cores, and for this reason the T-slots 12 and teeth 13 are provided, which enable different sized tables 14 and rings 16 to be employed. Bolts 17 secure the table 14 to the T-slots 12. Thus if a larger table 14 is to be used, the T-slots 12 and teeth 13 accommodate the larger size of the table. The teeth 13 hold the table positively in a central position with respect to the main shaft 5, while the T-slots 12 permit the bolts 17 to be adjusted radially.

Supported on the ring 16 is a cylindrical core 18, which extends up through a plate 19, which is secured to a split ring 20 shown in detail in Fig. 13. The plate 19 has shouldered lugs 21 which engage a ring 22 on the lower end of a cylindrical mold 23. On the upper end of the core 18 is a ring 24 with tamping blades 25 arranged at an angle as shown in detail in Fig. 14, and above the ring 24 is a cone 26 with handles 27 and a guide 28. Slidable over the guide 28 is a cap 29, which is secured to a stem 30, the latter being slidable through the guide 28 and at its lower end having a slotted cross head 31 with rollers 32 which are adapted to engage a pair of arms 33 which are pivoted at 34 to a ring 35 secured by bolts 36 against the underside of an inwardly projecting flange 37 on the ring 24, the bolts 36 being screwed into inside lugs 38 on the cone 26. The lower ends of the arms 33 are held by springs 39 in engagement with screw threads 40 on a short shaft 41, which is in line with the main shaft 5 and secured thereto by a coupling 42. The threads 40 have abrupt shoulders, as clearly shown in Fig. 15, which enable the arms to be quickly shoved down over the threads to engage therewith while the shaft is rotating. By pressing down on rod 30 the cross head 31 will tilt the arms 33 and release them from the threads. The purpose of this construction is to permit quick attachment or detachment without stopping rotation of the shaft. Immediately after attachment, the rotation of the shaft causes the threads to screw down on the shaft and take up all slack. The shaft 41 extends through a hub 43, from which arms 44 extend to the core 18 so that the core 18 is held centrally on the shaft. Rotation of the core is effected through the table 14 and lugs 15.

The shaft 5, sleeve 7, and parts supported thereby, with the core 18, are capable of vertical movement to carry the core 18 up into the mold 23 as the operation of making a length of pipe progresses. The shaft 5 and parts rotated thereby are kept under constant rotation by means of a gear 45 on the shaft 5 which meshes with a long pinion 46 which permits the gear 45 to rise with the shaft 5 and still maintain its mesh with pinion 46.

As shown in Fig. 7, secured to one side of the sleeve 7 is a rack 47 which meshes with a pinion 48 which is mounted on a shaft 49 in bearings 50 and having a sprocket 51 which is connected by a chain 52 with a sprocket 53 which is operated by a clutch consisting of two members 54 and 55, both of which are mounted on a shaft 56, the shaft 56 being journaled in bearings 57 and having a gear 58 meshing with a gear 59 on the driving shaft 60, which is journaled in bearings 61 and 62 and driven by a pulley 63 through the medium of a clutch 64.

On the shaft 49 is a ratchet wheel 65 which, as clearly shown in Fig. 6, is engaged by a pawl 66 pivoted at 67, and also by an operating pawl 68 pivoted at 69 to an arm 70 which is pivotally supported on the shaft 49, the pawl 68 also being connected by a link 71 with the lower end of a lever 72 which is pivoted at 73. An eccentric rod 74 is connected at 75 to the arm 70 and is operated by an eccentric 76 on shaft 56. A rod 77 is pivotally connected to a crank arm 78 carried on a shaft 79 mounted in a bracket 80 projecting from the bearing 61, as shown in Fig. 2. The rod 77 has three collars 81, 82 and 83 rigidly secured thereto and has sliding collars 84 and 85. The collar 84 has a pin 86 which engages the retaining pawl 66, while the collar 85 has a pin 87 which loosely engages the arm 72.

A coil spring 88 is arranged between the rigid collar 82 and the sliding collar 84 and thus serves to normally press the pivotal point 86 to the right and hold the pawl 66 yieldingly in engagement with the ratchet 65, thereby preventing the ratchet 65 from moving rearwardly. A coil spring 89 bears against the rigid collar 83 and against the sliding collar 85 and holds the arm 72 yieldingly toward the ratchet wheel 65.

As the arm 70 is rocked by the eccentric 76 it actuates the pawl 68 so that the latter moves ratchet wheel 65 one tooth at a time, the pawl 68 being yieldingly held against the ratchet wheel by the spring-pressed arm 72. By moving the rod 77 to the left, the pressure of both springs 88 and 89 is removed against their respective collars 84 and 85, and the rigid collars 81 and 82 respectively bear against the sliding collars 84 and 85 and positively swing the retaining pawls 66 and arms 72 and upper end of pawl 68 to the left, thereby disengaging both pawls 66 and 68 from the ratchet wheel 65, this engagement being accomplished even though the arm 70 is continuously rocked by the eccentric. By moving the rod 77 to the right again the pawls are caused to reëngage the ratchet 65 and are kept in such engagement by the pressure of springs 88 and 89. Also mounted on the shaft 56 is a clutch consisting of members 90 and 91, the member 91 being connected with the eccentric 76 so that when both members 90 and 91 are in engagement the eccentric is operated, while when the members 90 and 91 are disengaged the eccentric is not operated.

As shown in Fig. 3, a sleeve 92 slidable on shaft 56 is connected to the clutch member 55 and a sleeve 92' also slidable on shaft 56 is connected to clutch member 90 and to sleeve 92 and forms virtually a continuation of sleeve 92 so that when the sleeve 92' is operated both clutch members are operated. Both sleeves are attached to a slotted member 93, which is actuated by an arm 94 on shaft 95. Thus when the sleeve 92 is moved to the right, the clutch member 90 is engaged with clutch member 91, and clutch member 55 is moved away from and disengages the clutch member 54, while by moving the sleeve 92 to the left clutch member 55 may be engaged with clutch member 54, and clutch member 90 disengaged from clutch member 91, or by moving the sleeve 92 to central position both clutch members 55 and 90 will be held out of engagement with clutch members 54 and 91.

In order to prevent shock to the machine, the clutch members 55 and 90 are each formed of a hub $a$ with wings $b$ and a box $c$, with inwardly projecting wings $d$, as shown in Figs. 4 and 5. Between the wings $b$ and $d$ are rubber segments $e$. The hubs $a$ are secured to the sleeves 92 and 92', while the boxes $c$ are loose in the sleeves and provided with lugs $f$ for coacting with the associated clutch members. The interposed rubber segments cushion the clutching action.

An arm 96 is secured to one end of the shaft 95 and projects into the channel in the side of the rack 47. Secured to the rack 47 is a stop 97 and a stop 98 as shown in Fig. 7, the stop 98 being adapted to strike the arm 96 at the limit of upward motion of rack 47 and thereby automatically stop further upward movement of the rack 47, by rocking shaft 95 in the direction of the arrow, Figs. 2 and 7, and through arm 93 move both clutch members 90 and 55 to central position, thereby disengaging both clutches and stopping the operation of the eccentric 76, thus stopping actuation of pawl 68 and actuation of ratchet 65. This turning movement of shaft 95 operates through segmental bevel gears $x$ and $y$ to turn shaft 79 in the direction of the arrow, Fig. 6, and push rod 77 to the left thereby disengaging the pawls 66 and 68. The downward travel of the rack and core is caused to commence by operating hand lever 110 to actuate link 115 and rock the shaft 95 in the direction of the arrow, Fig. 2, and place clutch member 55 in engagement with clutch member 54, thereby causing shaft 56 to be rotated in the direction of the arrow, Fig. 2, and through the medium of the sprocket and chain connection drive shaft 49 in a direction opposite to the arrow, Fig. 2, thereby moving the rack 47 and core downwardly. This same movement of shaft 95 acts through segment gears x and y to turn shaft 79 still farther and this keeps the ratchet mechanism inoperative so that the downward movement is accomplished by the sprocket and chain connection and is a continuous steady movement. At the limit of downward movement the stop 97 strikes the arm 96 and rocks the shaft 95 in the direction opposite the arrow, Figs. 2 and 7, thereby through the medium of arm 94 moving both clutch members 55 and 90 to mid-position thereby releasing clutch member 54 which stops the operation of shaft 49 and further downward movement of rack 47. At this time, although shaft 60 continues to revolve shaft 49 remains stationary because both clutches are in mid position and neither the sprocket and chain connection or ratchet mechanism are operating. When the upward travel is to be produced, the lever 110 is operated to pull up on link 115 and turn shaft 95 in a direction opposite to the arrow, Fig. 2, thereupon moving clutch member 90 from mid position into engagement with clutch member 91 causing the eccentric 76 to operate the pawl 68 of the ratchet mechanism. This same turning movement of the shaft 95 operates through the bevel segment gears x and y to turn shaft 79 in a direction opposite the arrow, Figs. 2 and 6, and pull rod 77 in the direction opposite the arrow, Fig. 6, thereby bringing pawl 68 into operative engagement with ratchet 65 and as the eccentric 76 is now operating and the pawls 68 and 66 are in engagement, the ratchet mechanism becomes operative and imparts intermittent rotation to shaft 49 and the latter imparts an intermittent upward movement to rack 47 and the core, which continues until the upward limit of movement has been reached where further upward movement is automatically stopped.

The pinion 46 has a bevel gear 99 on its upper end, see Figs. 1 and 2, which meshes with a bevel gear 100 on shaft 60 by means of which the pinion 46 is rotated.

The split ring members 20 are expanded or contracted, as shown in Fig. 13, by means of a pair of upper rods 101 and lower rods 102, which pass through both ring members, as shown, the upper rods 101 being secured by pins 103 to the right hand member 20 in Fig. 13, and the lower rods 102 being secured by pins 104 to the left hand member 20. The rods are provided with racks 105 and a shaft 106 is provided with gear teeth 107 which mesh with the racks 105 and is provided with a handle 108 for operating it. When the shaft 106 is turned in either direction it operates the rods 101 and 102 in opposite directions. Thus, looking at Fig. 13, when the lever 108 is swung to the left, rods 101 will move to the left and rods 102 move to the right, thereby moving both collar members 20 closely together, while when the lever 108 is moved in the opposite direction the collar members 20 will be moved apart.

Loosely mounted on the shaft 106 are bell crank levers 109 and 110. The lever 109 is connected by a link 111 with an arm 112 on a shaft 113, see Figs. 1 and 2, and forked levers 114 carried by a shaft 113 operate the clutch 64. The lever 110 is connected by a link 115 with an arm 116 on shaft 95 for operating the latter shaft. Thus by operating the lever 109 the entire machine may be started or stopped, and by operating lever 110 the clutch members 55 or 90 may be placed in mid position, or either engaged with its coöperating clutch member.

The mold 23 is shown in detail in Figs. 10 and 11 and is of well known construction, being a cylindrical sheet metal member, split longitudinally at 117, and eye-bolts 118 are pivoted to brackets 119 riveted at one side of the opening 117, the eye-bolts being connected to shackles 120 which are connected to a rod 121 having arms 122 which are pivoted to brackets 123. A handle 124 is secured to rod 121 so that by swinging the handle 124 outwardly the mold 23 will be expanded, while by swinging the handle 124 inwardly the mold 23 will be contracted into the position shown in Fig. 11.

In operation the parts stand as shown in Fig. 1 at the commencement of making a pipe section. The shaft 5 is under rotation and the core 18 is being rotated. Concrete is introduced into the mold from the spout x, Fig. 12, the concrete falling to the bottom of the mold and resting on the blade 125. As the machine operates, the core is moved upwardly by the before described ratchet mechanism, the core rotating as it rises and the spiral blades 25 screw the concrete downwardly and act as tampers to pack the concrete solidly in the annular space between the core and mold. When the core arrives at the top, its further upward movement is arrested by the before described stop mechanism. Then by pushing down on rod 30, the arms 33 are freed from threads 40, and by grasping handles 37, cone 32 may be lifted off and then the ring 24 which carries spiral blades 25 may be removed. Then lever 110 is operated to place clutch member 55 in engagement with clutch member 54, whereupon the downward travel of the core commences, while still rotating. The downward travel of the core is stopped at the end of its movement by automatic mechanism before described. Lever 108 is operated to open the clamp member 20 and then the mold 23 with the molded pipe section within it is lifted from the plate 19 and another mold is placed in the machine, ready for the operation of making the next pipe section.

What I claim is:—

1. In a pipe making machine, a mold, a core mounted to move within said mold, a shaft on which said core is mounted, said shaft being provided with screw threads, a cone at the end of said core, tampers secured to said cone, arms pivotally mounted upon said cone, said arms being provided with teeth for engaging the threads on said shaft, means for swinging said arms to bring said teeth into engagement with said threads, and means for swinging said arms to disengage said teeth from said threads.

2. In a pipe making machine, a mold, a core mounted to move within said mold, a shaft on which said core is mounted, said shaft being provided with screw threads, a cone at the end of said core, tampers secured to said cone, arms pivotally mounted on said cone, said arms provided with teeth for engaging the threads on said shaft, means for moving said arms to bring said teeth into engagement with said threads, a rod extending through said cone, a cross head on said rod, rollers on said cross head, said arms provided with inclined edge adapted to be engaged by said rollers, for disengaging said teeth from said threads.

3. In a pipe making machine, a mold, a core mounted to move within said mold, a shaft on which said core is mounted, said shaft being provided with screw threads having abrupt faces, a cone at the end of said core, tampers secured to said cone, arms pivotally mounted upon said cone, said arms being provided with teeth shaped to conform with said threads for engaging said threads, means for moving said arm to bring said teeth into engagement with said thread, and means for swinging said arms to disengage said teeth from said threads.

In testimony whereof, I have hereunto set my hand at Los Angeles, California, this 7th day of December, 1911.

VLADIMIR V. MESSER.

In presence of—
GEORGE T. HACKLEY,
GLADYS RUSSELL.

Copies of this patent may be obtained for five cents each, by addressing the "Commissioner of Patents, Washington, D. C."